Feb. 11, 1930.                G. G. GILPIN                1,746,585
                       CAR COUPLER OPERATING DEVICE
                            Filed Jan. 26, 1929

Inventor:
Garth G. Gilpin
Linton Edison.
Attorney.

Patented Feb. 11, 1930

1,746,585

UNITED STATES PATENT OFFICE

GARTH G. GILPIN, OF RIVERSIDE, ILLINOIS, ASSIGNOR TO UNION METAL PRODUCTS COMPANY, OF CHICAGO, ILLINOIS, A CORPORATION OF DELAWARE

CAR-COUPLER-OPERATING DEVICE

Application filed January 26, 1929. Serial No. 335,345.

The invention relates to devices for operating railway car couplers, and more particularly, to the relation between the operating rod of such a device and the connector which connects the operating rod to the car coupler lock lifter.

The invention is an improvement over the structure disclosed in Gilpin Patent No. 1,411,489 of April 4, 1922, wherein the connector has a vertically slidable, and non-rotative, engagement with an eye of a crank forming part of the operating rod. The upper part of this connector forms a semi-circular open hook projecting toward the outer side of the eye and away from the car so as to permit the coupler to move abnormally forward without binding the connector in the eye of the crank. The extremity of this hook is provided with an enlarged head so that the connector must be threaded into the eye of the crank of the operating rod by inserting the lower portion of the connector through the eye. The lower end of the connector is formed into a helical or spiral shaped open loop for engagement with the eye of the coupler lock lifter.

The object of my invention is to so form the connector and the eye of the operating rod that the relation between the two is such that the connector cannot be assembled with the operating rod with the hook projecting in any other position than projecting away from the car, or toward the outside of the eye, because when the connector is assembled in the operating rod with the hook projecting toward the car, a slight forward movement of the coupler causes the extremity of the hook to engage the crank of the operating rod and thereby restrict the forward movement of the coupler. Of course, owing to great force, which causes the coupler to move forward, its movement is not actually restricted but rather the connector or the operating rod is bent or twisted so as to seriously affect their proper operation.

Figure 1:
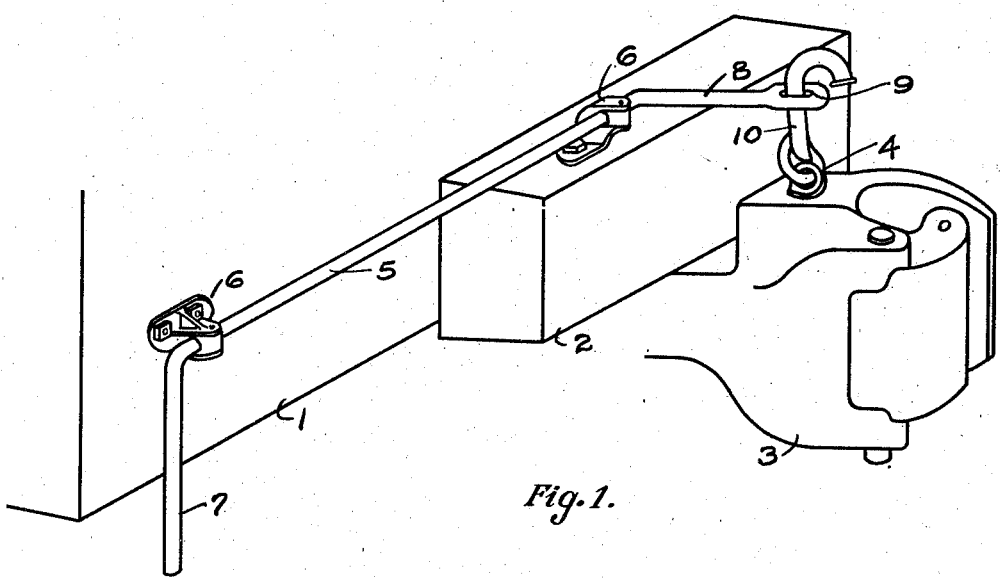
Fig. 1 shows a typical application of my device to a railway car.
Figure 2:
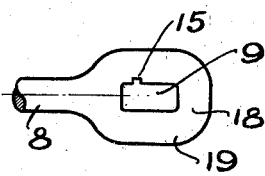
Fig. 2 is an enlarged detail showing the eye in the end of the crank of the operating rod.
Figure 3:
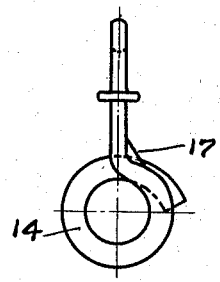
Figs. 3 and 4 show the connector.
Figure 4:
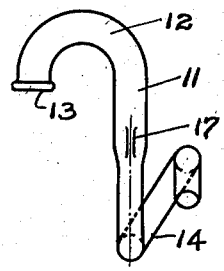

In the drawings the usual parts of the car are shown, such as end wall 1; buffing block 2; coupler 3; coupler lock lifter 4; operating rod 5; bracket 6; handle 7; crank 8; crank eye 9 and connector 10. The connector comprises a shank 11 having at its upper end a hook 12 and head 13, and at its lower end a spiral or helical open hook 14, the form and functions of which have been heretofore described.

Figure 5:
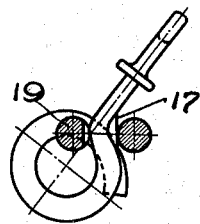
Figs. 5 and 6 show the relation of the connector and the eye of the operating rod in different positions.
Figure 6:
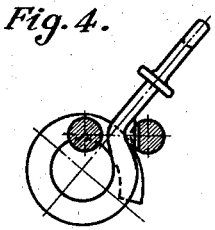

In order to assure proper assemblage of the connector 10 with the crank eye 9 I provide a slot or groove 15 in the crank eye for reception of a rib 17 positioned between the shank and the helical loop of the connector. When the connector is properly inserted in the eye of the crank arm, that is, with the upper hook 12 projecting away from the car or toward the outer side 18 of the eye 9, the rib 17 slides through the groove 15, as shown in Fig. 6, and permits the complete insertion of the connector through the crank eye. If, however, an attempt is made to improperly engage the connector with the crank eye, the rib 17 intereferes with the opposite wall 19 of the crank eye, as shown in Fig. 5, thus preventing the connector from being inserted in the eye of the crank eye. The workman then realizes his mistake and withdraws the connector and inserts it through the eye in the proper way.

The rib has the further advantage that it reinforces the connector at the junction between the shank and the spiral hook, thus materially strengthening it to resist forces tending to straighten out the connector.

The broad feature of so forming the crank eye and the connector that the connector cannot be improperly inserted in the crank arm eye is disclosed and broadly claimed in an application No. 335,187 for patents filed of even date by Charles W. Nicholas of Chicago, Illinois, which application is assigned to my assignee.

The groove may be positioned in any part of the crank eye and the projection placed in any corresponding desired position on the connector and still come within the scope of the invention.

The accompanying drawings illustrate the preferred form of the invention, though it is to be understood that the invention is not limited to the exact details of construction shown and described, as it is obvious that various modifications thereof within the scope of the claims will occur to persons skilled in the art.

I claim:

1. In an operating device for a railway car coupler, the combination of an operating rod provided with a vertically disposed eye having a groove, a connector comprising a substantially vertical shank arranged for slidable and non-rotative movement through said eye, a semi-circular hook at the upper end of said shank having an enlargement at its extremity, and a helical open loop at the lower end of the shank for engagement with an eye of a coupler lock lifter, said shank also provided with a rib at the juncture of the shank and the helical loop arranged for passage through said groove, said groove and rib so positioned and proportioned that the connector can only be assembled with the operating rod eye with the upper hook projecting toward the outer side of the eye.

2. As an article of manufacture, a connector for a car coupler and its operating rod comprising a substantially vertical shank, a semi-circular hook at the upper end of said shank having an enlargement at its extremity, and a helical open loop at the lower end of the shank, said shank also provided with a rib at the juncture of the shank and the helical loop.

GARTH G. GILPIN.